(12) United States Patent
Einecke et al.

(10) Patent No.: US 10,321,625 B2
(45) Date of Patent: Jun. 18, 2019

(54) AUTONOMOUS WORKING MACHINE SUCH AS AUTONOMOUS LAWN MOWER

(71) Applicant: HONDA RESEARCH INSTITUTE EUROPE GMBH, Offenbach/Main (DE)

(72) Inventors: Nils Einecke, Offenbach (DE); Mathias Franzius, Offenbach (DE); Jörg Deigmöller, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 0 days.

(21) Appl. No.: 15/394,889

(22) Filed: Dec. 30, 2016

(65) Prior Publication Data
US 2017/0188510 A1 Jul. 6, 2017

(30) Foreign Application Priority Data
Dec. 30, 2015 (EP) ..................... 15203100

(51) Int. Cl.
*G05B 15/00* (2006.01)
*G05B 19/00* (2006.01)
(Continued)

(52) U.S. Cl.
CPC ............ *A01D 34/008* (2013.01); *B60R 11/04* (2013.01); *G05D 1/027* (2013.01); *G05D 1/0251* (2013.01);
(Continued)

(58) Field of Classification Search
CPC ............ A01D 2101/00; A01D 34/008; G05D 1/0251; G06K 9/00791; G06T 2207/10012; H04N 13/0203
(Continued)

(56) References Cited

U.S. PATENT DOCUMENTS 5,974,348 A * 10/1999 Rocks ....................... G01S 1/70
348/120
9,562,773 B2 * 2/2017 Paduano ................ G01C 21/20
(Continued)

FOREIGN PATENT DOCUMENTS

DE 10 2007 016 802 A3 5/2008
DE 10 2012 221 572 A1 5/2014
(Continued)

OTHER PUBLICATIONS

European Search Report dated Jun. 14, 2016 corresponding to European Patent Application No. 15203100.1.

*Primary Examiner* — Harry Y Oh
(74) *Attorney, Agent, or Firm* — Squire Patton Boggs (US) LLP

(57) ABSTRACT

The invention regards an autonomous working machine comprising drive means, current position estimation means, control means including a driving control unit and a camera. With aid of the current position estimation means the current position of the autonomous working machine is estimated. Furthermore, the driving control unit generates driving commands for the driving means on the basis of an intended movement of the autonomous working machine and the estimated current position. The camera is configured to capture images of the environment of the working machine. For estimating the current position, the current position estimation means is formed by the control means, which is configured to apply visual odometry on the captured images for estimating the current position of the working machine.

12 Claims, 2 Drawing Sheets

(51) Int. Cl.
*A01D 34/00* (2006.01)
*G06T 7/70* (2017.01)
*H04N 13/204* (2018.01)
*B60R 11/04* (2006.01)
*G05D 1/02* (2006.01)
*G06K 9/00* (2006.01)
*H04N 7/18* (2006.01)
*A01D 101/00* (2006.01)

(52) U.S. Cl.
CPC ......... *G05D 1/0253* (2013.01); *G05D 1/0272* (2013.01); *G06K 9/00791* (2013.01); *G06T 7/70* (2017.01); *H04N 7/183* (2013.01); *H04N 13/204* (2018.05); *A01D 2101/00* (2013.01); *G05D 2201/0208* (2013.01); *G06T 2207/10012* (2013.01); *G06T 2207/30252* (2013.01)

(58) Field of Classification Search
USPC ........................................................ 700/259
See application file for complete search history.

(56) References Cited

U.S. PATENT DOCUMENTS

| | | | | |
|---|---|---|---|---|
| 2008/0039974 A1* | 2/2008 | Sandin | ................ | G05D 1/0255 700/258 |
| 2009/0319170 A1* | 12/2009 | Madsen | ............... | A01B 69/001 701/532 |
| 2016/0165795 A1* | 6/2016 | Balutis | ................ | G05D 1/0265 701/25 |
| 2017/0267178 A1* | 9/2017 | Shiga | ........................ | B60R 1/00 |

FOREIGN PATENT DOCUMENTS

| | | |
|---|---|---|
| EP | 2 135 498 A1 | 12/2009 |
| EP | 2 199 983 A1 | 6/2010 |
| EP | 2 757 524 A1 | 7/2014 |
| EP | 2 894 601 A1 | 7/2015 |
| WO | WO 2005/084155 A2 | 9/2005 |
| WO | WO 2014/079632 A1 | 3/2014 |

* cited by examiner

AUTONOMOUS WORKING MACHINE SUCH AS AUTONOMOUS LAWN MOWER

BACKGROUND

Field

The invention regards an autonomous working machine such as an autonomous lawn mower or scarifier comprising driving means for self-propelled driving, current position estimation means, control means including a driving control unit for generating driving commands for the driving means on the basis of which a driving direction and driving speed is adjusted, and a camera that is configured to capture images of an environment of the working machine.

Description of the Related Art

In order to increase the comfort for people who have to do for example gardening various working machines have been developed over the last decades. A more recent development in order to further increase the comfort is that such working machines are self-propelled which means they have the capability to move on a lawn being driven by for example an electric motor and without the gardener needing to push the working machine. Nevertheless for quite a while it was still necessary that the gardener controls the working machine such as a lawn mower or a scarifier which means he needed to adjust the speed of the working machine and also the driving direction manually.

Further improvement regarding comfort was achieved by working machines that are capable of autonomous driving. Autonomous in this context means that without the gardener permanently controlling the working machine the machine could drive around autonomously and thus mow a lawn or fulfill another working task without presence of a supervisor. In most cases this could not be achieved without unnecessary movements and unnecessary driving paths of the autonomous working machine, because the machine is driving randomly around. It is evident that the same argumentation and the same aspects are true also for any autonomous working machines including indoor applications such as vacuum cleaners and the like. Nevertheless in the following the working machine will be a lawn mower and explanations will be based on such example.

As mentioned above these early autonomous lawn mowers would drive around randomly. The outer edge of a working area which is the area within which the mower shall perform its working operation a border wire was buried in the soil. The mower while driving around randomly at some point reaches such border wire or other indicator of the outer edge of the working area, performs a turn and then drives straight again until the border wire is reached again or an obstacle is detected. For detecting such obstacles bump sensors are commonly used. In recent times recognition of obstacles is supplemented by image processing systems sometimes. These image processing systems are capable of determining obstacles that lie in the way of the straight driving lawn mower. Thus, even before a contact with such an obstacle is recognized by a bump sensor the mower can make a turning movement in order to avoid the collision.

Obviously such random drive is not very efficient regarding the power consumed by the autonomous lawn mower until the entire area is mowed. Thus, it would be desirable if such autonomous lawn mower would follow a predetermined or intended path that is designed in order to avoid unnecessarily driving the same area twice. Furthermore, obstacles can be avoided in a more intelligent manner by means of a smooth path around the obstacle instead of a simple turning maneuver. Using the concept of such intended path driving needs to have knowledge about a current position of the lawn mower in order to control if the mower indeed follows the intended path or mowing pattern. Typically such mowers use rate encoders or IMUs (inertial measurement units) to measure a real movement in order to determine if the mower follows the intended path of the system. The real movement of the mower may be compared to the intended movement being a result of commands that are supplied to a driving unit of the autonomous lawn mower. The commands with which the motor operation is controlled in order to follow a dedicated path cannot already consider the response characteristic of the motor. Consequently, there will occur a deviation of the mower's position and its intended position. With increased driving distance this deviation will typically increase and lead to mowing results that are not satisfying. Another problem is that rate encoders may not give reliable results due to wheel slip for example. On the other side IMUs have a strong drift over time which for example causes problems in case of long parallel drive ways. Thus, even if the drive commands are corrected on the basis of an estimated position of the mower the low accuracy of the position estimation makes it impossible to control the mower following the intended path or pattern precisely.

DE 10 2007 016 802 B3 discloses a method for correcting the movement of an autonomous vehicle. But one problem still is that even here the basis for the correction signal is still derived by using rate encoders. On the basis of the rate encoders a predetermined distance is driven by the mower and after such predetermined distance a camera captures an image of the environment. Then again the autonomous vehicle drives the predetermined distance and captures a new image of the environment from its new position. These images are then used for triangulation to determine the current position of the mower and thereafter a correction measure is calculated from a deviation of the estimated current position from a corresponding position on the intended path.

SUMMARY

It is now an object of the present invention to improve the performance of autonomous working machines by estimating a current position of the autonomous working machine more reliably and with sufficient precision without employing systems that cause high costs. Of course there is technology available that is sufficiently precise but such systems cause costs which are not acceptable in the market of such autonomous lawn mowers or the like.

According to the present invention the autonomous working machine comprises a driving means, current position estimation means, control means including a drive control unit and a camera. The current position estimation means estimates a current position of the autonomous working machine. This can be used in order to determine a deviation from an intended driving path and/or to track the driving path of the working machine. The driving control unit generates driving commands for the driving means along an intended path thereby controlling speed and direction of the working machine so as to follow the intended path. The driving commands are generated on the basis of such intended movement and an estimated current position. It is to be recognized that an intended movement may be a predefined route (or direction) along which the working machine shall move but also could be set relative to a previously driven route. This means that for example after driving straight until an obstacle was recognized the lawn mower or other working machine may turn around and drive parallel to the previously driven path. This will also result in an efficient coverage of an entire working area such as a lawn, but is more flexible than a predefined route.

With the camera images the environment of the working machine is captured at different points in time which are, according to the invention, then used in order to estimate a current position of the working machine. The current position estimation means according to the invention is formed by the control means, which is configured to apply visual odometry on the captured images and thus to determine a current position of the lawn mower. The big advantage of the inventive approach is that for estimating a current position of the lawn mower the system does not have to rely on the accuracy of the rate encoders, which is very limited. And although the algorithms used in the visual odometry also suffer from a drift problem similar to that of IMUs there is an advantage regarding cost. For the same price range as an IMU unit, the visual odometry offers systems with a similarly high precision but where the drift is much less. Thus, in particular if a pattern movement of a whole lawn area shall be realized, the performance can be improved significantly by use of a visual odometry for current position estimation. Another big advantage is that the visual odometry directly measures the perceived movement, which therefore is very precise also for slow movement. This is in contrast to the position estimation on the basis of IMUs because the movement estimation precision of IMUs decreases for slow movement. This results from the position difference being an integration over time via the accelerometers.

In the sub-claims, there are defined advantageous aspects of the present invention.

In particular, it is an advantage when the camera is a stereo camera. With a stereo camera, it is possible to compute 3D data from the stereo camera images, which then may be used to enhance the visual odometry estimation.

According to another advantageous aspect, a ground plane assumption is used to enhance the visual odometry estimation.

It is in particular advantageous to mount the camera in the driving direction of the autonomous working machine. In that case, the camera may not only be used for the visual odometry, but at the same time the images captured by the camera can be used in order to perform an obstacle recognition.

According to another advantageous embodiment, a correction signal is generated on the basis of a difference between a current intended position and the corresponding estimated current position. In the control means, this difference is calculated and on the basis of this calculated difference the drive commands that are sent to the driving means are generated. The generation includes for example generation of initial drive commands that are generated taking into consideration theoretical characteristics of the driving means and geometrical aspects such as wheel diameter. Motor response characteristic and influences as wheel slip lead to a deviation of position, which is measured. The initial drive commands are then corrected based on the calculated difference to generate the drive commands.

Preferably, the control means is configured to adapt the time gap between images used for visual odometry according to the intended movement. If for example the autonomous working machine performs a turning movement, then the time interval or gap between two images captured and used for the visual odometry is shortened relative to the time gap used when driving straight. This increases the accuracy of the position estimation, since when the same time intervals as for straight drive are used also for a turning movement, only a reduced number of pixels may correspond to pixels of the corresponding image in the past due to chance of perspective. Thus, the accuracy of the position determination is reduced when constant time gaps are used. This can be avoided by capturing images with flexibly adjusted time intervals where the adjustment is performed on the basis of the current driving actions like turning movements or driving straight. Of course, the time gaps can also be adjusted to the speed at which the autonomous working machine currently drives. For example for low speeds the time gaps can be increased.

Furthermore, it could be advantageous if the visual odometry is performed using a plurality of different time gaps and merging the results thereof. However, according to another advantageous embodiment, the visual odometry can also be merged with results for separately performed position estimation based on wheel odometry (like using rate encoders) or IMU.

According to another advantageous embodiment on the basis of the difference between the intended movement and the estimated current position, a wheel slip of the working machine can be detected. Thus, it can be analyzed how efficient the driving means is operated. In particular, under slippery conditions as a result the speed and acceleration of the working machine could be reduced. The results of the visual odometry calculation can also be accumulated according to another preferred embodiment, since the occurrence of a predetermined event. Such dead-reckoning may be used for example in order to guide back the working machine to its charging station. In order to do so, a reset of previously accumulated results is performed every time the working machine for example leaves the charging station in order to resume its working operation or alternatively every time it passes by the working station. Such autonomous lawn mowers usually may recognize a close distance to the charging station in order to find back to the charging station at the end of a working operation or if the batteries are discharged below a predetermined threshold.

If a reset is performed every time the working machine is close to its charging station—or another predetermined location to which the working machine might return in a most efficient manner—and then the accumulation of the result is started again, this results in the smallest error possible and thus, the way back to the position where the reset has been performed is more accurate and efficient.

According to another preferred embodiment, the autonomous working machine may recognize predetermined events and store information on the occurrence of such events related to an estimated current position at the time of occurrence. Thus, with the control means it is for example as a predetermined event recognized that the bump sensor indicates that an obstacle was hit. The control means then can store such obstacle in relation to the position that is estimated by the current position estimation means. By doing so, a map of the working area of the autonomous lawn mower can be built up, which in turn can be used for adapting working strategies for the autonomous working machine.

All the suggested aspects are in particular advantageous for autonomous working machines such as autonomous lawn mowers or autonomous scarifier.

BRIEF DESCRIPTION OF THE DRAWINGS

The invention will now be described with respect to the annexed drawings in which.

DETAILED DESCRIPTION

Figure 1:
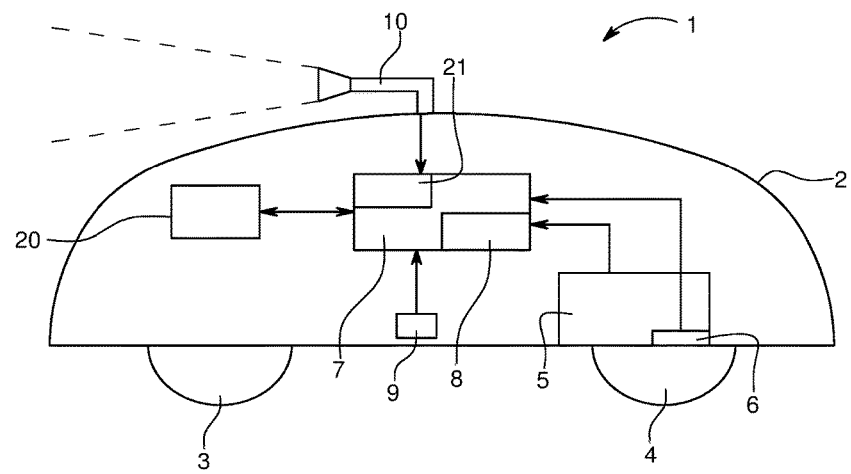
FIG. 1 shows an overview over the structure of an autonomous working machine.

A schematic of an autonomous lawn mower 1 according to an embodiment of the present invention is illustrated in FIG. 1. It is to be noted that any information and detail of the invention described with respect to the autonomous lawn mower of course might also be used in other autonomous working machines such as scarifiers, vacuum cleaners and the like.

The autonomous lawn mower 1 comprises a housing 2 housing most of the components that are necessary for fulfilling the mowing operation and the autonomous driving of the mower. In particular the housing 2 also supports drive wheels 3, 4. For controlling speed of the autonomous lawn mower 1 usually rear wheels 4 are driven by a driving means. In order to control the speed and direction of the autonomous lawn mower 1 the driving means comprises an electric motor 5 for each of two rear wheels 4. Both of the electric motors 5 can be controlled individually. Thus, the rotation of the left and the right rear wheel 4 can also be controlled separately. As a consequence a synchronous rotation of the rear wheels 4 is possible but also a difference in the rotational speed of the rear wheels 4. As a result the driving direction of the autonomous lawn mower 1 may be controlled.

The autonomous lawn mower 1 further comprises, control means 7 controlling all the functions of the autonomous lawn mower 1. These functions include not only the driving of the autonomous lawn mower 1 but also its working operation which means the mowing operation. For simplicity of the drawings and in order not to overload the schematic of FIG. 1 with information any components regarding the mowing system of the autonomous lawn mower is not illustrated. Such system components per se are known in the art.

The control means 7 may be a single central processing unit or may comprise a plurality of processors that in common perform the functionality as described herein with respect to the control means. In particular the control means 7 includes a driving control unit 8 which—as mentioned—may be a separate entity or a functional portion of the control means 7. In the driving control unit 8 drive commands are generated. The drive commands after being generated are supplied to the electric motors 5. Electric motors 5 are furthermore connected to an energy storage such as an accumulator which is also for sake of simplicity of the drawing not illustrated.

The control means 7 is furthermore connected to a non-volatile memory 20 and is capable of storing information in the non-volatile memory 20 and for retrieving data therefrom. In the non-volatile memory 20 there may for example be stored a predetermined path which the autonomous lawn mower 1 shall follow. On the basis of such predetermined path after reading the corresponding data by the control means 7 the intended path is submitted to the driving control unit 8. In the driving control unit 8 on the basis of the received information about the intended driving path initial driving commands are generated. The initial driving commands are generated such that under ideal circumstances the resulting operation of the electric motors 5 would lead to the autonomous lawn mower 1 following precisely the intended path. But in real systems because of the response characteristic of the electric motors 5 and also because of environmental influences the resulting real trajectory of the autonomous lawn mower 1 most probably will deviate from the intended path. Thus, the initial driving commands, generated in the driving control unit 8, need a correction in order to bring back the autonomous lawn mower 1 onto the intended driving path. This is achieved on the basis of feedback information about the real current position of the autonomous lawn mower 1.

According to the present invention visual odometry is used in order to estimate the current position of the autonomous lawn mower 1. Visual odometry is the process of determining equivalent odometry information using sequential camera images to estimate a distance travelled. Visual odometry allows for enhanced navigational accuracy in robots or vehicles using any type of locomotion on any surface. Visual odometry as such and respective algorithms in order to estimate the current position of a vehicle is known in the art. Consequently a detailed description thereof will be omitted.

The visual odometry system of the inventive autonomous lawn mower 1 comprises a camera 10 which is preferably mounted on top of the housing 2 and advantageously directed so as to face into driving direction so that during regular operation of the autonomous lawn mower 1 the camera 10 is oriented to the front.

The system further comprises a current position estimation means 21, which is formed by the control means 7. The current position estimation means 21 receives image signals from the camera 10. Camera 10 captures images of the environment of the autonomous lawn mower 1 with predetermined time gaps between the captured images.

The time gaps may be adjusted flexibly according to the driving situation of the autonomous lawn mower 1. This can either be done by changing the frame rate of the camera or by keeping a fixed frame rate for the camera and ignoring or not ignoring some of the captured images. In particular, the time gaps between two consecutive images can be adjusted in case of a turning movement so as to be smaller than during straight driving of the autonomous lawn mower 1. Thus, if the electric motors 5 of the autonomous lawn mower 1 are controlled so as to differ in rotational speed, the time gap between two consecutive images captured is reduced by the control means 7. Another aspect that could be considered when setting the time gap between the consecutive images is the speed at which the autonomous lawn mower 1 travels. For both aspects the basis for setting the time gap is the control of the electric motors 5 by the driving control unit 8.

It is preferred that the camera 10 is a stereo camera. The use of a stereo camera allows the control means 7 to generate on the basis of the stereo images a three-dimensional data of the environment of the autonomous lawn mower 1. The use of such three-dimensional data improves the position accuracy of the visual odometry algorithms and thus, at relatively low additional costs for a stereo camera instead of a mono camera the overall system performance may be enhanced. Alternatively, or in addition a ground plane assumption may be used to enhance the visual odometry estimation.

In addition to the visual odometry system comprising camera 10 and current position estimate means 21 the autonomous lawn mower 1 may comprise an IMU (inertial measurement unit) 9 for estimating the current position. The results of the IMU-estimation and the visual odometry may be merged and the thus achieved information on the current position of the autonomous lawn mower 1 be used in order to generate the driving commands in the driving control unit 8.

Further, rate encoders 6 may be provided in the autonomous lawn mower 1 which are capable of determining information about the rotation of the driven rear wheels 4. And the information from the rate encoder 6 may also be used in order to estimate the current position of the autonomous lawn mower 1. As described above with respect to the IMU 9 also an estimation about the current position on the basis of the signals received from the rate encoders 6 may be calculated in the control means 7 and the position information is then merged with the results of the visual odometry and the position estimation based on the merged results is used in the driving control unit 8 in order to generate the driving commands.

Of course, it is also possible to merge the results of all three estimation units which means visual odometry, IMU and rate encoders.

To generate the driving commands in the driving control unit 8, the estimated current position is compared to a corresponding position that should be reached in case that the autonomous lawn mower 1 would perfectly follow an intended driving path. To calculate the difference in the control means 7, the intended driving path is compared to the estimated current position and a difference is calculated. The difference includes information about the distance between the current estimated position and the intended driving path and information about a direction. On the basis of the distance and the information about direction, the driving control unit 8 generates a correction signal that is added to the initial driving commands. This results in a generation of driving commands which are then supplied to the electric motors 5.

The calculation of a difference between the intended driving path and the estimated current position may not only be used in the generation of the driving commands, but also to determine wheel slip. If, for example, the deviation of the current position from the intended driving path exceeds a certain threshold, it could be concluded that a wheel slip must have been occurred. But also for detection of failures of the system, such as a broken drive shaft, this difference between the estimated current position and the intended path can be used.

In the information obtained by estimating the current position of the autonomous lawn mower 1 may not only be used in order to generate correction signals that are then applied on the initial driving commands in order to generate driving commands, but also to generate for example a map of the environment of the autonomous lawn mower 1. In order to do so, the information about the current position may be stored in the memory related to events that occurred and could be recognized by the autonomous lawn mower 1. Such events may be for example signals of a bump sensor, which gives information about an obstacle lying in the driving path of the autonomous lawn mower 1. Such information can be accumulated in the memory 20 and on the basis of this information a map could be built. Furthermore, odometry data could be accumulated in order to determine a position of the autonomous lawn mower 1 reached from the point in time when this accumulated odometry data has been reset for the last time. Such reset could be performed for example when the autonomous lawn mower 1 leaves its charging station 13. The accumulated data then could be used in order to guide back the autonomous lawn mower 1 to the charging station 13.

Figure 2:
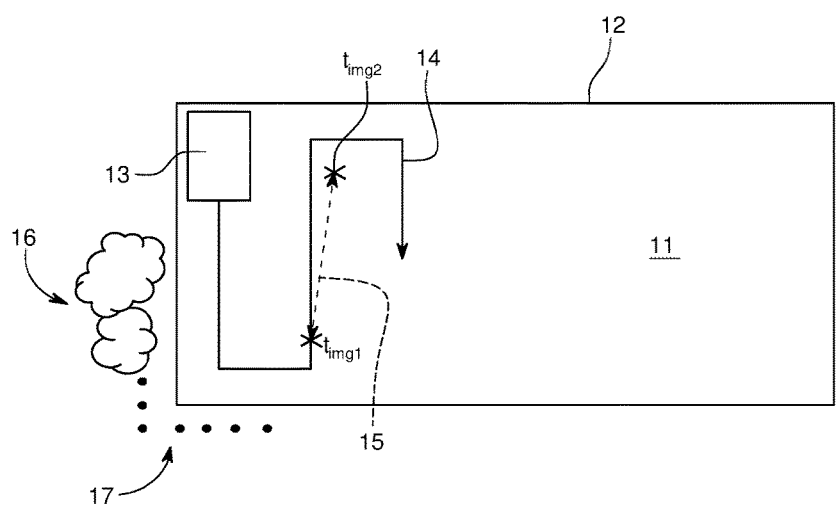
FIG. 2 shows a schematic illustrating of an intended path for movement of the working machine.

In order to illustrate the functionality of the current position estimation in FIG. 2 a working area 11 is shown. Along the edge of the working area 11, which in the illustrated embodiment is of a simple, rectangular shape, a boarder wire 12 is buried in the soil. The use of such boarder wires 12 in order to inform the autonomous lawn mower 1 about reaching the edge of its working area 11 is known in the art. Of course, alternatively other systems could be used to limit the working area 11.

In one corner of the working area 11, a charging station 13 is located. When the autonomous lawn mower 1 is not in use, the autonomous lawn mower 1 usually is connected to the charging station 13 in order to recharge its accumulator.

Starting from the charging station 13, an intended path 14 for the working operation of the autonomous lawn mower 1 is shown. Furthermore, a possible real trajectory 15 of the autonomous lawn mower 1 is shown. It can be recognized that the real movement of the autonomous lawn mower 1 would deviate from the intended path 14. In order to avoid such deviation, the real movement of the autonomous lawn mower 1 is corrected by use of the current position estimation system as described above. As an example for objects that are perceived by the camera 10, trees or hedges 16 are illustrated in the drawing. Other possible objects could be a fence 17 or the like.

Figure 3:
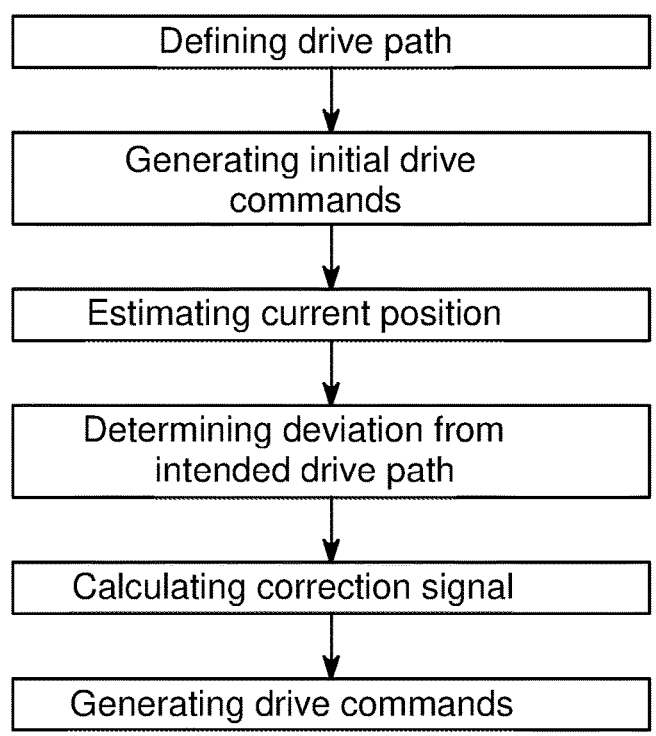
FIG. 3 a flow chart illustrating the mower's method for generating drive commands.

A simple flow chart explaining the method for generating the drive commands is shown in FIG. 3. At first in step S1 a drive path for the autonomous lawn mower 1 is defined. In the next step on the basis of drive path, which means in knowledge of the direction and a set speed, initial drive commands are generated in step S2. Then the current position of the autonomous lawn mower 1 is estimated in step 3 as described above and the estimated current position after the predetermined time gap between the two images that were captured by the camera and used for estimation of the current position is determined. This determined estimated current position is compared to the position that should have been reached, if the autonomous lawn mower 1 followed the intended drive path (step 4). The difference between this corresponding position on the intended drive path and the estimated current position is the basis for calculating a correction signal in step S5. The drive commands that are then generated in step S6, in order to control the electric motor 5, take into consideration the initial driving commands and the correction signal. Thus, after each time interval when the position is estimated after having captured a new image of the environment of the autonomous lawn mower 1, the drive commands take account of an error that occurred during the last time interval.

As a consequence, the autonomous lawn mower 1, which is permanently corrected regarding its real trajectory, follows precisely the intended drive path. One aspect to be mentioned is that in the example, which is illustrated in FIG. 2 parallel mowing is intended with straight driving from edge to edge of the working area 11. Of course, this is just one example of a pattern of the intended drive path and other patterns like for example a spiral or similar patterns are also possible. Furthermore, it is not necessary that the entire intended drive path is predefined and for example stored in memory 20.

The invention claimed is:
1. An autonomous working machine comprising:
   driving means;

memory for storing information indicating an intended path which the autonomous working machine shall follow;

control means including a current position estimation unit for estimation of a current position of the autonomous working machine, and a driving control unit for generating initial driving commands for the driving means, wherein the driving commands are generated on the basis of an estimated current position such that the resulting operation of the driving means leads to the autonomous working machine following precisely the intended path; and a camera configured to capture images of an environment of the autonomous working machine, wherein the control means is configured to apply visual odometry on the captured images for estimating the current position of the autonomous working machine,
to compare the estimated current position to a corresponding position that should be reached in case that the autonomous working machine would perfectly follow the intended driving path,
to generate a correction signal on the basis of a difference thereof, and
to add the correction signal to the initial driving commands, and wherein the control means is configured to accumulate the results of the visual odometry calculation since the detection of a vicinity of a charging station for the autonomous working machine or leaving the same to start a working operation, and to use the accumulated results in order to guide back the autonomous working machine to the charging station.

2. An autonomous working machine according to claim 1, wherein
the camera is a stereo camera.

3. An autonomous working machine according to claim 2, wherein
the control means is configured to compute 3D data from stereo images captured by the stereo camera and use the 3D data to improve current position estimation.

4. An autonomous working machine according to claim 1, wherein
the control means is configured to use ground plane assumption to improve current position estimation.

5. An autonomous working machine according to claim 1, wherein
the camera is mounted on the working machine so as to face a forward driving direction.

6. An autonomous working machine according to claim 1, wherein
the control means is configured to adapt a time gap between images used for visual odometry according to the intended movement.

7. An autonomous working machine according to claim 6, wherein
time gaps are shorter for turning movements than for straight drive or slow movement.

8. An autonomous working machine according to claim 6, wherein
visual odometry is performed using different time gaps and results are merged afterwards.

9. An autonomous working machine according to claim 1, wherein
results of visual odometry is merged with results for position estimation based on wheel odometry or IMU.

10. An autonomous working machine according to claim 1, wherein
the control means is configured to detect wheel slip on the basis of said difference.

11. An autonomous working machine according to claim 1, wherein
the autonomous vehicle further comprises recognition means to recognize predetermined events and the control means is configured to store information on occurrence of such events related to an estimated current position at the time of occurrence.

12. An autonomous working machine according to claim 1, wherein
the autonomous working machine is an autonomous lawn mower or an autonomous scarifier.

* * * * *